(12) United States Patent
Tomioka et al.

(10) Patent No.: US 11,613,196 B2
(45) Date of Patent: Mar. 28, 2023

(54) RAMP SYSTEM FOR VEHICLE

(71) Applicants: TOYOTA JIDOSHA KABUSHIKI KAISHA, Aichi-ken (JP); AISIN SEIKI KABUSHIKI KAISHA, Aichi-ken (JP)

(72) Inventors: Takuya Tomioka, Toyota (JP); Hideki Maeda, Toyota (JP); Koichi Hirota, Kariya (JP); Taiki Ishiguro, Kariya (JP); Tomoyuki Kato, Kariya (JP); Takeshi Nishikibe, Kariya (JP)

(73) Assignees: TOYOTA JIDOSHA KABUSHIKI KAISHA, Aichi-ken (JP); AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/169,548

(22) Filed: Feb. 8, 2021

(65) Prior Publication Data
US 2021/0245650 A1 Aug. 12, 2021

(30) Foreign Application Priority Data
Feb. 12, 2020 (JP) .............................. JP2020-021819

(51) Int. Cl.
*B60P 1/43* (2006.01)
*A61G 3/06* (2006.01)
*E05F 15/76* (2015.01)
*E05F 15/73* (2015.01)

(52) U.S. Cl.
CPC .............. *B60P 1/431* (2013.01); *A61G 3/061* (2013.01); *E05F 15/73* (2015.01); *E05F 15/76* (2015.01); *E05F 2015/767* (2015.01); *E05Y 2400/454* (2013.01); *G06T 2207/30252* (2013.01); *Y10S 414/134* (2013.01)

(58) Field of Classification Search
CPC .......... A61G 3/061; B60P 1/431; E05F 15/73; E05F 15/76; E05F 2015/767; E05Y 2400/454; G06T 2207/30252
See application file for complete search history.

(56) References Cited

U.S. PATENT DOCUMENTS 10,493,893 B2 * 12/2019 Matsuoka ............... B60P 1/436
11,083,650 B2 * 8/2021 Salter ..................... A61G 3/061
11,105,141 B2 * 8/2021 Kito ......................... E05F 15/73
(Continued)

FOREIGN PATENT DOCUMENTS

DE 102017000461 A1 * 8/2017 .............. B60R 1/00
EP 0416539 A1 3/1991
(Continued)

*Primary Examiner* — James Keenan
(74) *Attorney, Agent, or Firm* — Hauptman Ham, LLP

(57) ABSTRACT

When it is confirmed that a user exists based on an image of the situation outside a vehicle which is captured using a camera and a proximity sensor detects a fact that the user is approaching based on, for example, a putting of a hand of the user over the proximity sensor, a control device causes a ramp to be extended. As such, a user sitting in a wheelchair can cause the ramp to be extended by approaching the proximity sensor, such as the putting of the user's hand over the proximity sensor such that the user sitting in the wheelchair does not have to press an extension/storage button provided on the vehicle to cause the ramp to be extended.

18 Claims, 6 Drawing Sheets

(56) References Cited

U.S. PATENT DOCUMENTS

| | | | | |
|---|---|---|---|---|
| 2014/0207344 | A1* | 7/2014 | Ihlenburg | E05F 15/73 |
| | | | | 701/49 |
| 2017/0234053 | A1* | 8/2017 | Myers | E05F 15/76 |
| | | | | 340/426.15 |
| 2019/0193620 | A1 | 6/2019 | Matsuoka et al. | |
| 2020/0122642 | A1 | 4/2020 | Sato et al. | |
| 2020/0157875 | A1* | 5/2020 | Jones | E05F 15/76 |

FOREIGN PATENT DOCUMENTS

| | | | | | |
|---|---|---|---|---|---|
| EP | 2757490 | A1 | * | 7/2014 | B60P 1/431 |
| EP | 3109117 | A1 | * | 12/2016 | B60R 16/023 |
| JP | 2010013824 | A | * | 1/2010 | E05F 15/73 |
| JP | 2015021238 | A | * | 2/2015 | B60J 5/06 |
| JP | 2018108769 | A | | 7/2018 | |
| JP | 2019116112 | A | | 7/2019 | |
| JP | 2020164142 | A | | 10/2020 | |
| KR | 100762246 | B1 | * | 10/2007 | E05F 15/73 |
| WO | WO-2010127379 | A1 | * | 11/2010 | E05F 15/611 |
| WO | WO-2011058856 | A1 | * | 5/2011 | B60R 1/00 |
| WO | WO-2019187496 | A1 | * | 10/2019 | E05F 15/73 |

\* cited by examiner

RAMP SYSTEM FOR VEHICLE

CROSS-REFERENCE TO RELATED APPLICATION

This application claims priority to Japanese Patent Application No. 2020-021819 filed on Feb. 12, 2020, incorporated herein by reference in its entirety.

BACKGROUND

1. Technical Field

The present disclosure relates to a ramp system for a vehicle.

2. Description of Related Art

Japanese Unexamined Patent Application Publication No. 2019-116112 discloses a technology relating to a ramp device for an electrically driven vehicle. In this technology, the ramp device checks the presence and absence of a sidewalk using a camera mounted on the vehicle, calculates a height difference and distance between a road or sidewalk at a boarding and exiting place of a user, such as a bus stop, and the floor of the vehicle, adjusts an angle at which a ramp is fed, and feeds out the ramp to the outside of the vehicle.

SUMMARY

The electrically driven vehicle in the related art can be applied as an autonomous vehicle, but it is also assumed that no person exists in the autonomous vehicle. For this reason, when the electrically driven vehicle is applied as the autonomous vehicle, it is necessary to enable a user outside the vehicle to operate an operation switch used for causing a ramp to be extended. Therefore, it is considered that the vehicle is provided with the operation switch.

However, since a user sitting in a wheelchair cannot reach for the switch with his or her hand, a caregiver is needed for the user sitting in the wheelchair to board the vehicle. In this respect, there is room for further improvement.

The present disclosure provides a ramp system for a vehicle in which even a user sitting in a wheelchair can cause a ramp to be extended.

A ramp system for a vehicle according to an aspect of the present disclosure includes a ramp extension and storage mechanism configured to extend and store a ramp from and into the vehicle, an image capturing device configured to capture an image of a situation outside the vehicle, a proximity sensor configured to detect a fact that a detection target is approaching, and a control device configured to, when the vehicle is stopped at a predetermined place, control the ramp extension and storage mechanism such that the ramp extension and storage mechanism extends the ramp in a case where it is confirmed, using the image capturing device, that a user exists outside the vehicle and the proximity sensor detects the fact that the detection target is approaching. The ramp is configured to enable the user who boards and exits the vehicle to move.

In the above configuration, the ramp system includes the ramp extension and storage mechanism, the image capturing device, the proximity sensor, and the control device. The ramp extension and storage mechanism can extend and store the ramp enabling the user to move from and into the vehicle. Further, the image capturing device is configured to capture the image of the situation outside the vehicle and the proximity sensor is configured to detect the fact that the detection target is approaching the proximity sensor.

Then, when it is confirmed that the user exists based on the image of the situation outside the vehicle which is captured using the image capturing device and the proximity sensor detects a fact that the user is approaching based on, for example, a putting of a hand of the user over the proximity sensor, the control device causes the ramp extension and storage mechanism to extend the ramp.

In other words, in the above configuration, since the user sitting in the wheelchair can cause the ramp to be extended by approaching the proximity sensor, the user sitting in the wheelchair does not need a caregiver, and can cause the ramp to be extended by himself or herself without the caregiver. In other words, even the user sitting in the wheelchair can cause the ramp to be extended.

In the above aspect, the "predetermined place" refers to a bus stop or a boarding and exiting place designated in advance by the user. In addition, in the above aspect, the "detection target" includes an object, such as a cane or an umbrella, in addition to a part of a human body.

In the above aspect, when it is confirmed, using the image capturing device, that the user is pointing the detection target at the proximity sensor, the control device may control the ramp extension and storage mechanism such that the ramp extension and storage mechanism extends the ramp.

In the above configuration, when it is confirmed that the user is pointing the detection target, such as stretching out his or her hand, at the proximity sensor based on the image of the situation outside the vehicle which is captured using the image capturing device, the control device causes the ramp extension and storage mechanism to extend the ramp.

In other words, in the above configuration, even when the user sitting in the wheelchair is not approaching the proximity sensor, when it is confirmed, using the image capturing device, that the user is pointing the detection target at the proximity sensor, such as stretching his or her hand toward the proximity sensor, the ramp is extended. As such, in the above configuration, it is possible to cause the ramp to be extended even in a situation where the user sitting in the wheelchair is not approaching the proximity sensor. In other words, the user sitting in the wheelchair can cause the ramp to be extended even when not approaching the proximity sensor.

In the above aspect, the ramp system may include a remote device configured to transmit an extension instruction signal used for instructing the ramp to be extended. Upon receiving the extension instruction signal from the remote device, the control device may control the ramp extension and storage mechanism such that the ramp extension and storage mechanism extends the ramp regardless of a detection result of the proximity sensor.

In the above configuration, the ramp system includes the remote device that transmits the extension instruction signal used for instructing the ramp to be extended. Upon receiving the extension instruction signal, the control device causes the ramp extension and storage mechanism to extend the ramp regardless of the detection result of the proximity sensor.

In other words, in the above configuration, in a case where the remote device transmits the extension instruction signal, it is possible to, when the user's hands are full, such as holding an umbrella due to rain or the like, cause the ramp to be extended even without making a gesture of the user, such as stretching out the user's hand toward the proximity sensor. In other words, it is possible to cause the ramp to be extended via the remote device.

In the above aspect, the detection target may be a part of a body of the user.

In the above aspect, the detection target may be a hand of the user.

In the above aspect, the detection target may be a belonging of the user.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A ramp system for a vehicle according to an embodiment of the present disclosure will be described with reference to the drawings. In each drawing, arrows are appropriately illustrated. More specifically, an arrow UP represents the upper side in the vehicle longitudinal direction, an arrow FR represents the front side in the seat front-rear direction, and an arrow RH represents the right side in the seat width direction. In addition, in the following description, when the front-rear, longitudinal, and right-left directions are used without a special mention, they indicate front and rear in the seat front-rear direction, up and down in the vehicle longitudinal direction, and right and left when facing the traveling direction, respectively.

Configuration of Ramp System for Vehicle

First, a configuration of the ramp system for the vehicle according to the present embodiment will be described.

Figure 1:
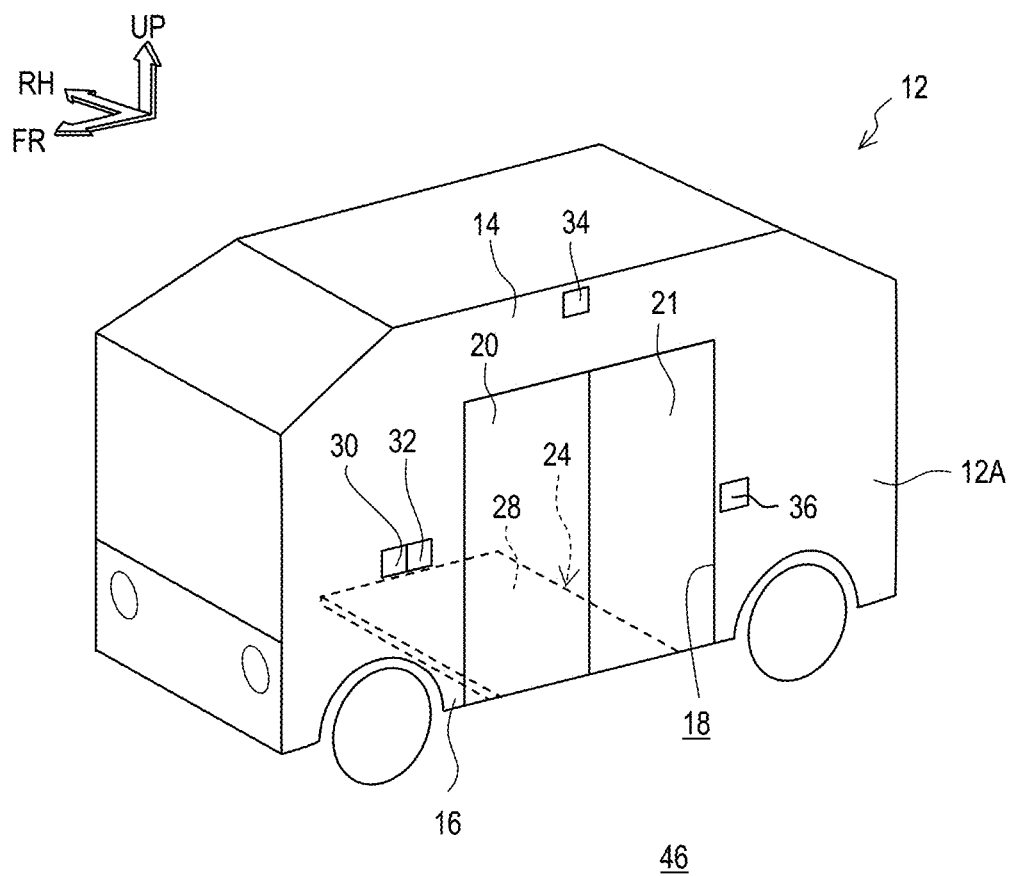
FIG. 1 is a perspective view illustrating a state where a ramp is stored in a vehicle including a ramp system for the vehicle according to an embodiment of the present disclosure, when viewed diagonally from the left front side of the vehicle.
Figure 2:
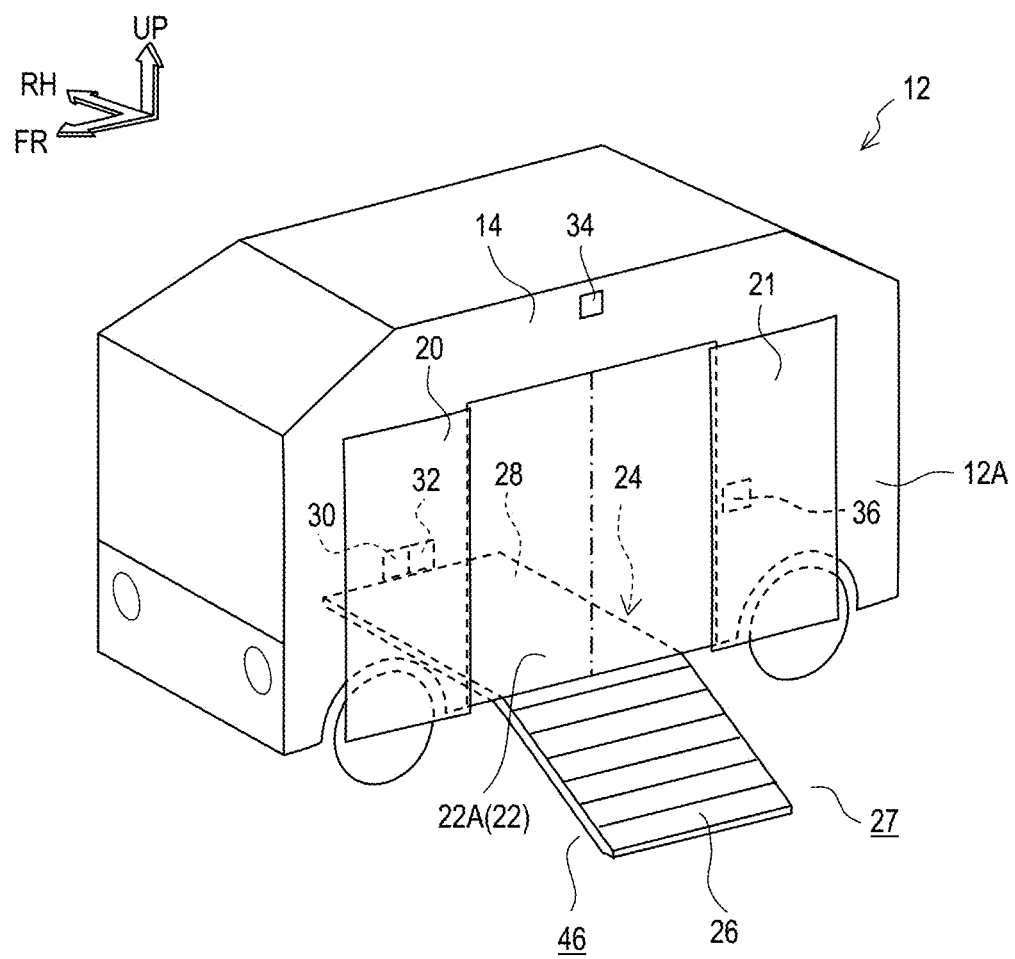
FIG. 2 is a perspective view illustrating a state where the ramp is extended from the vehicle including the ramp system according to the present embodiment, when viewed diagonally from the left front side of the vehicle.

FIGS. 1 and 2 illustrate a perspective view of a vehicle 12 including a vehicle ramp system 10 (FIG. 4) according to the present embodiment. The vehicle 12 illustrated in FIGS. 1 and 2 is an electrically driven vehicle that travels by autonomous driving and can also travel by remote control.

As illustrated in FIGS. 1 and 2, in a left side portion 12A of the vehicle 12, a rectangular opening 18 is formed from the upper portion 14 side to a lower end portion 16 of the vehicle 12 at the center of the left side portion 12A in the vehicle front-rear direction. The opening 18 can be opened and closed by a pair of doors 20, 21 that slides along the vehicle front-rear direction.

Here, FIG. 1 illustrates the vehicle 12 in a state where the doors 20, 21 are closed and a ramp 26 to be described below is stored. FIG. 2 illustrates the vehicle 12 in a state where the doors 20, 21 are open and the ramp 26 is extended.

As illustrated in FIG. 2, in the state where the doors 20, 21 are open, the door 20 is arranged on the outer side of the left side portion 12A of the vehicle 12 in the vehicle width direction ahead of the opening 18 in the vehicle front-rear direction, and the door 21 is arranged on the outer side of the left side portion 12A of the vehicle 12 in the vehicle width direction behind the opening 18 in the vehicle front-rear direction.

Moreover, a floor surface 22A of a floor portion 22 of the vehicle 12 is entirely flat, and a ramp device (a ramp extension/storage mechanism) 24 is provided on the lower side of the floor portion 22 at the center of the floor portion 22 in the vehicle front-rear direction. The ramp device 24 includes, for example, the rectangular plate-shaped ramp 26, a storage unit 28, and a drive motor 30.

The storage unit 28 is fixed on the back surface side of the floor portion 22, and the ramp 26 can be stored inside the storage unit 28. The width dimension of the ramp 26 is formed to be slightly shorter than that of the opening 18, and the ramp can move along the vehicle width direction by a driving of the drive motor 30 arranged in an inner portion of the storage unit 28.

Figure 3:
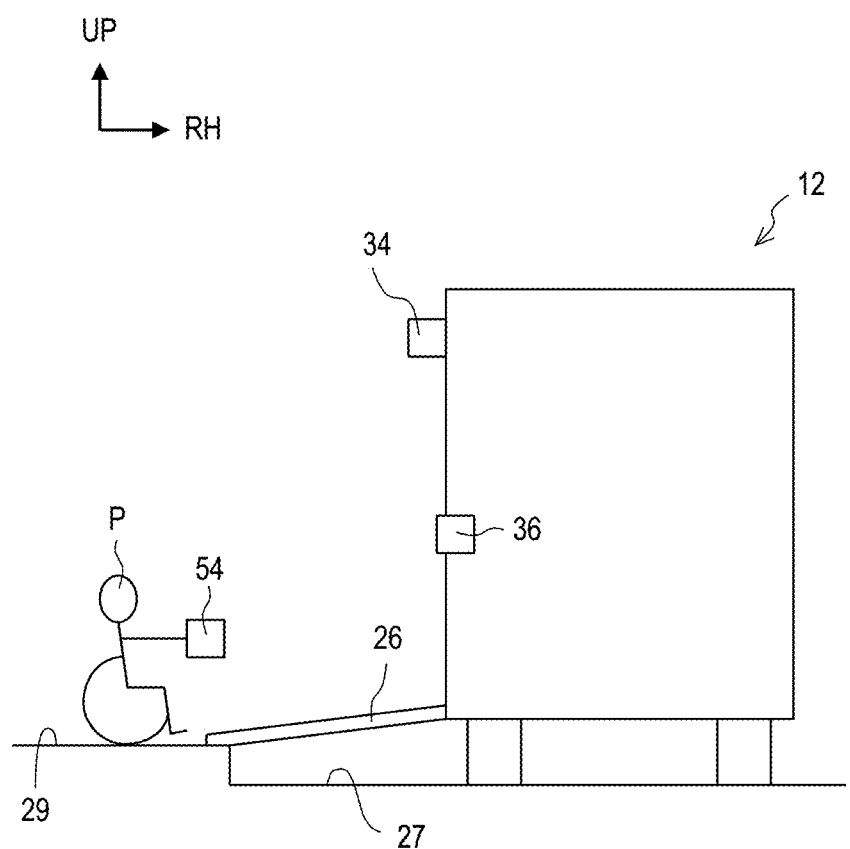
FIG. 3 is a rear view illustrating the state where the ramp is extended from the vehicle including the ramp system according to the present embodiment, when viewed from the rear side of the vehicle.

As illustrated in FIG. 1, when the drive motor 30 is driven in a state where the ramp 26 is stored inside the storage unit 28, as illustrated in FIGS. 2 and 3, the ramp 26 moves outward in the vehicle width direction and is extended to the outside of the vehicle.

Here, although not shown, a shaft portion having a line, as a shaft line, along the vehicle front-rear direction is provided in the rear end portion of the ramp 26 in the extending direction. As illustrated in FIG. 2, when the ramp 26 is fed out from the storage unit 28, a tip 26A of the ramp 26 becomes rotatable downward around the shaft portion.

In other words, when there is a height difference between the floor surface 22A of the floor portion 22 of the vehicle 12 and a sidewalk 29 or ground 27 (see FIG. 3), the ramp 26, in the extended state, inclines downward as it goes toward the sidewalk 29 or ground 27 side.

FIG. 3 is a rear view of the vehicle 12 illustrating a state where the floor portion 22 of the vehicle 12 and the sidewalk 29 are bridged by the ramp 26, when viewed from the vehicle rear side. As illustrated in FIG. 3, the floor portion 22 of the vehicle 12 and the sidewalk 29 are bridged by the ramp 26 such that the vehicle 12 can become barrier-free.

As illustrated in FIGS. 2 and 3, when the drive motor 30 is driven in the state where the ramp 26 is extended, the ramp 26 moves toward the vehicle 12, and, as illustrated in FIG. 1, is stored in the storage unit 28.

The ramp 26 may be composed of one or a plurality of sheets. When the ramp 26 is composed of a plurality of sheets, the sheets can be stacked in the vehicle longitudinal direction. Therefore, the space occupied by the storage unit 28 can be reduced, when viewed in a plan view.

Figure 4:
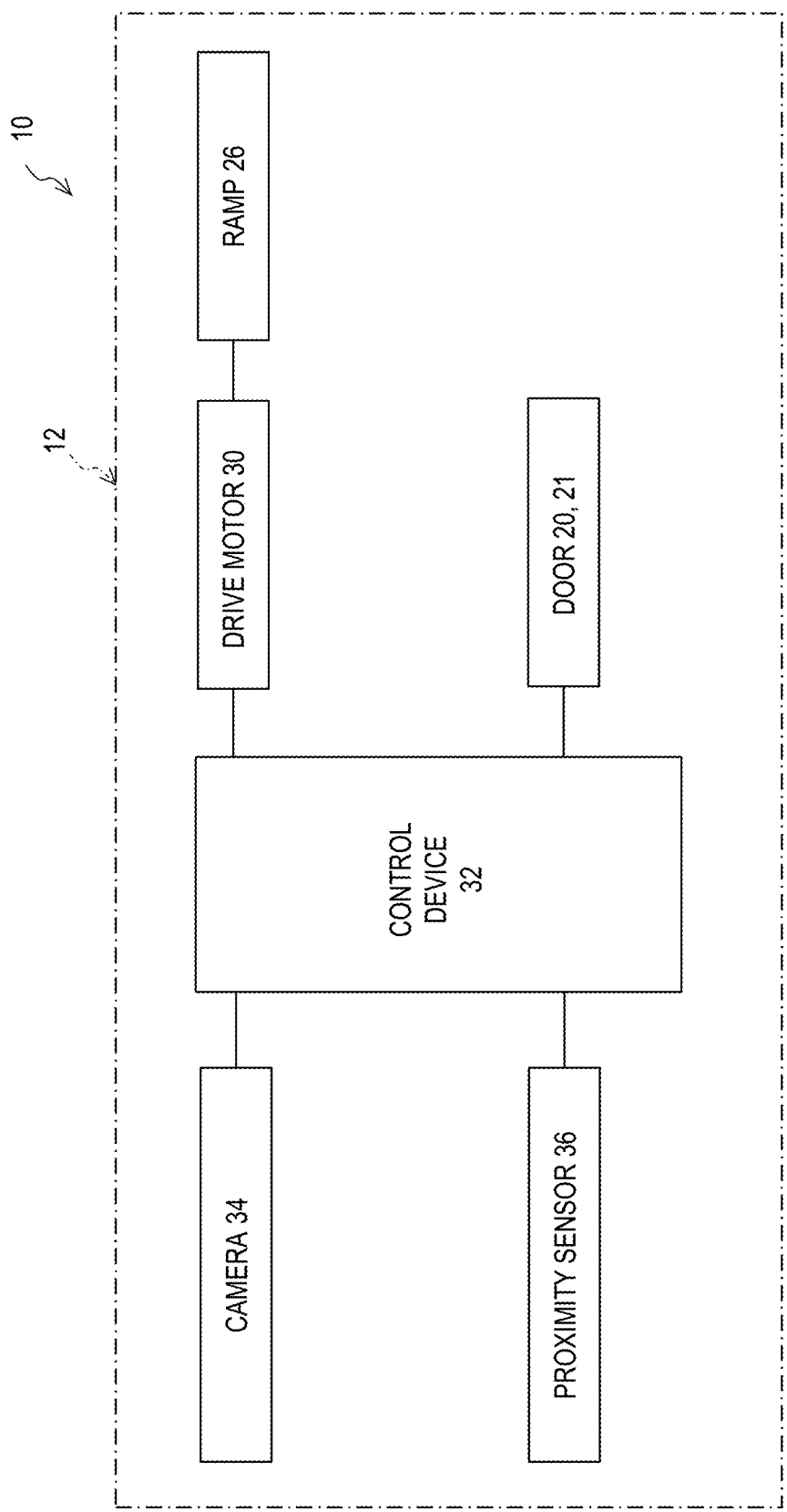
FIG. 4 is a block diagram illustrating a configuration of the ramp system according to the present embodiment.

Here, FIG. 4 is a block diagram illustrating a configuration of the vehicle ramp system 10 according to the present embodiment.

As illustrated in FIG. 4, in the present embodiment, the vehicle 12 includes a control device 32. Further, the vehicle 12 is provided with a camera 34 and a proximity sensor 36. These devices are respectively connected to the control device 32 via an input/output interface (not shown).

The camera 34 captures images of the situation outside the vehicle 12 (hereinafter, referred to as "outside the vehicle"). Here, as illustrated in FIG. 1, the camera 34 may be provided on, for example, the upper side of the opening 18 formed in the left side portion 12A of the vehicle 12.

The camera 34 may be a monocular camera but may also be a stereo camera. This is because the stereo camera has two image capturing units arranged so as to reproduce binocular parallax, and the image capturing information of the stereo camera also includes information on the depth direction.

Moreover, as the proximity sensor 36, for example, a capacitance-type sensor that functions by recognizing a change in capacitance that occurs between a human body and a sensor electrode is used, and the proximity sensor 36 can detect a fact that a user is approaching based on, for example, a putting of a hand of the user over the proximity sensor 36. The proximity sensor 36 can also detect the fact that the user is approaching based on an approaching of a cane, an umbrella, or the like, in addition to a part of the human body.

Although not shown, the control device 32 includes a receiving unit. As illustrated in FIG. 3, the receiving unit can receive a signal from a mobile device (a remote device) 54, such as a smartphone, owned by a user P who summons the vehicle 12.

When the user P summons the vehicle 12, the mobile device 54 is used. When necessary items are input to the mobile device 54, a signal of the input information is received to the receiving unit of the control device 32 via a base station (not shown), a network (not shown), or the like. Therefore, when information indicating that "barrier-free desired" is input to the mobile device 54, the control device 32 determines that the user P needs the ramp 26 when boarding/exiting the vehicle 12.

Further, although not shown, the vehicle 12 is provided with an extension/storage button. The extension/storage button is used for causing the ramp 26 to be extended or stored. As illustrated in FIG. 1, when the extension/storage button is pressed in the state where the ramp 26 is stored, a signal is transmitted to the control device 32 and the drive motor 30 is driven by the control device 32 such that the ramp 26 is extended.

On the other hand, as illustrated in FIG. 2, when the extension/storage button is pressed in the state where the ramp 26 is extended, a signal is transmitted to the control device 32 and the drive motor 30 is driven by the control device 32 such that the ramp 26 is stored.

Further, the vehicle 12 is provided with a vehicle weight detection device. The vehicle weight detection device is connected to the control device 32 via the input/output interface (not shown). The vehicle weight detection device detects the weight of the vehicle. The vehicle weight detection device is connected to the floor portion 22 of the vehicle 12 and can detect the vehicle weight by detecting the weight applied to the floor portion 22 of the vehicle 12. As such, it is possible to recognize the boarding/exiting situation of the user P.

Action and Effect of Ramp System for Vehicle

Next, an action and an effect of the ramp system for the vehicle according to the present embodiment will be described.

Figure 5:
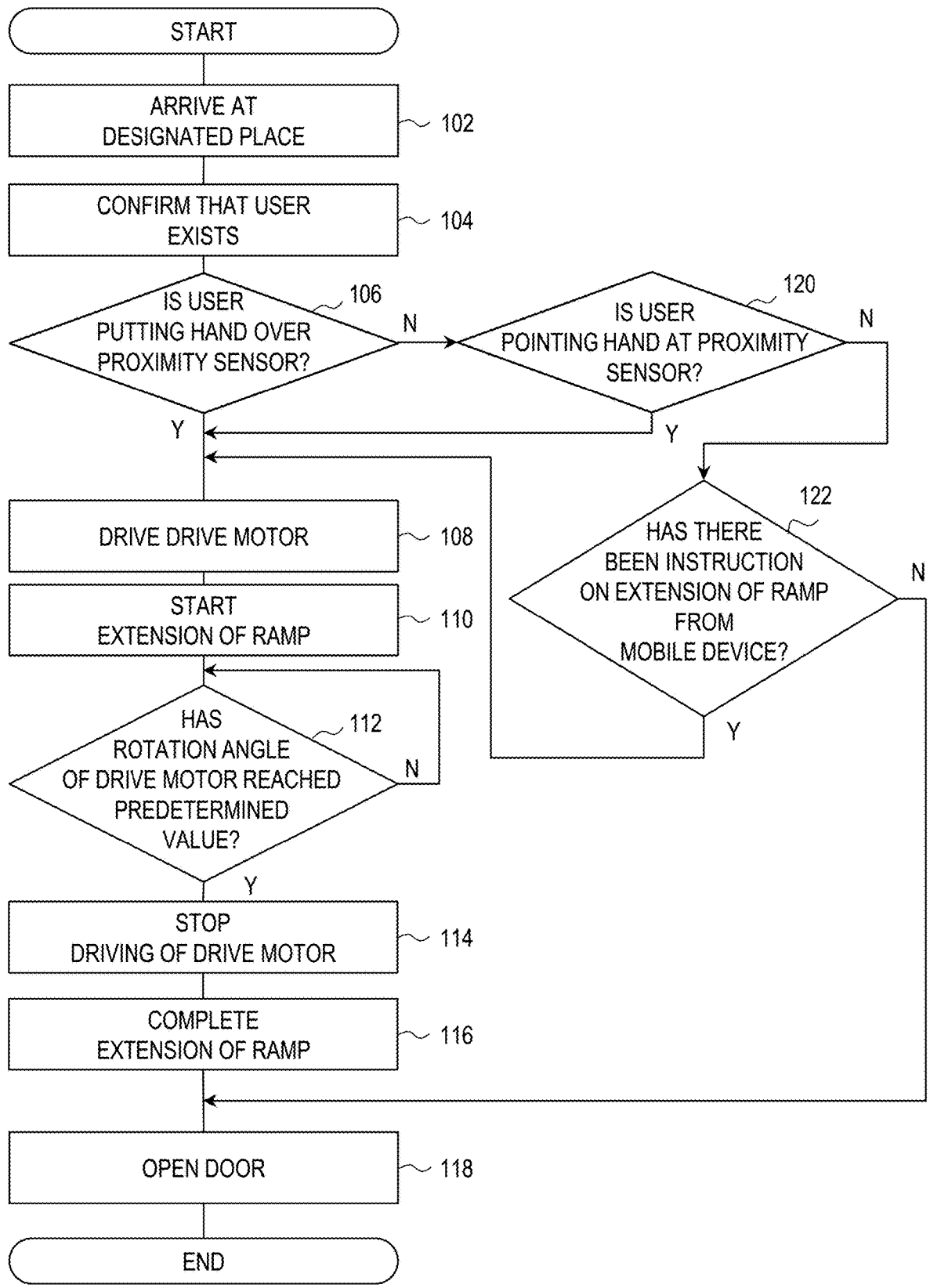
FIG. 5 is a flowchart describing a flow of processing until the ramp is extended from the vehicle including the ramp system according to the present embodiment.
Figure 6:
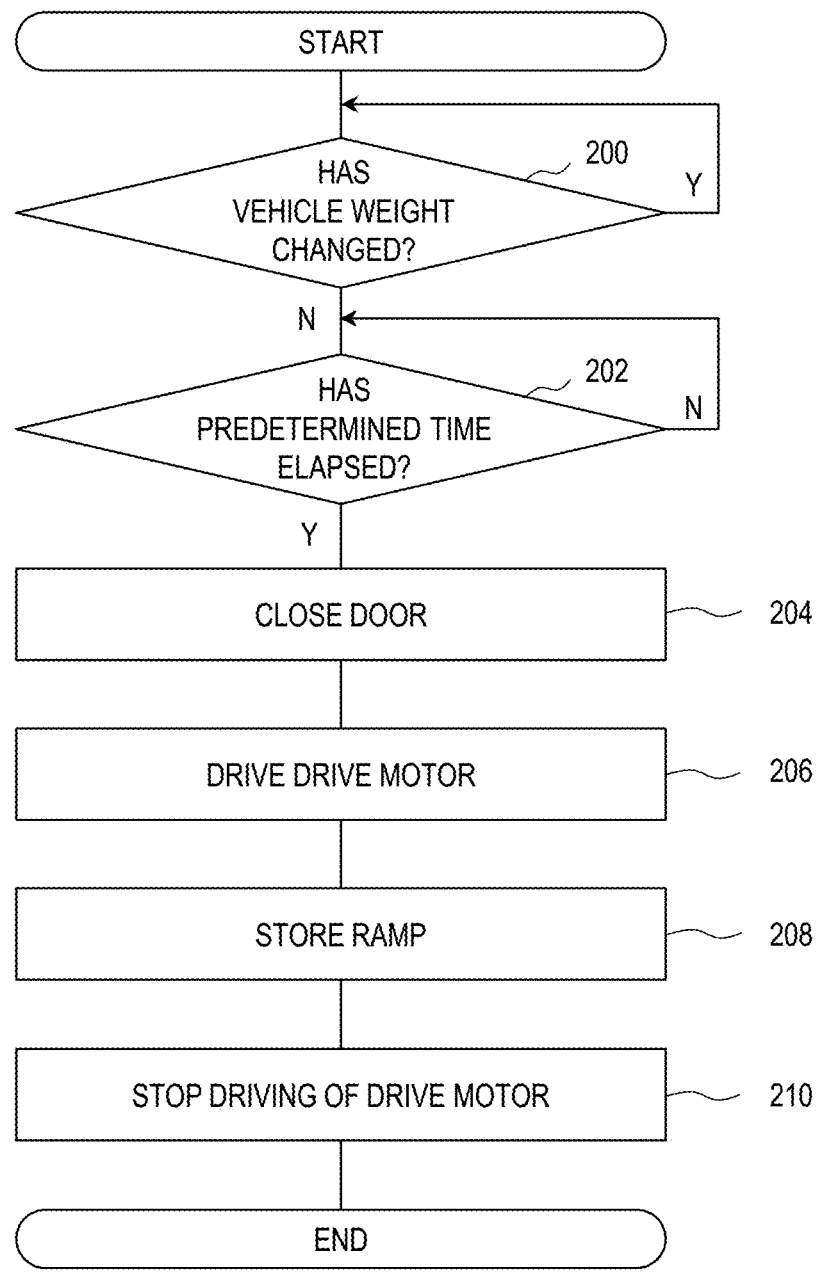
FIG. 6 is a flowchart describing a flow of processing until the ramp is stored in the vehicle including the ramp system according to the present embodiment.

The vehicle ramp system 10 according to the present embodiment will be described with reference to FIGS. 1 and 2, and flowcharts illustrated in FIGS. 5 and 6. FIG. 5 is a flowchart describing a flow of processing until the ramp 26 provided in the vehicle 12 is extended and FIG. 6 is a flowchart describing a flow of processing until the ramp 26 is stored in the storage unit 28 of the vehicle 12.

Extension of Ramp

First, the time when the ramp 26 is extended will be described.

As illustrated in FIGS. 1 and 5, in step 102, when the vehicle 12 has arrived at a designated place, the control device 32 proceeds to step 104. In step 104, after confirming that a user exists based on the images of the situation outside the vehicle which are captured using the camera 34, the control device 32 proceeds to step 106.

In step 106, the control device 32 determines whether the user P is putting his/her hand over the proximity sensor 36. In step 106, upon determining that the user P is putting his/her hand over the proximity sensor 36, the control device 32 proceeds to step 108.

In step 108, the control device 32 causes the drive motor 30 that causes the ramp 26 to move to be driven. As such, in step 110, as illustrated in FIG. 2, the extension of the ramp 26 within a ramp extension area 46 is started.

Next, in step 112, the control device 32 determines whether a rotation angle of the drive motor 30 has reached a predetermined value. In other words, in step 112, whether the ramp 26 has been definitely extended is confirmed. In step 112, the control device 32 repeatedly executes this processing until the rotation angle of the drive motor 30 reaches the predetermined value. The rotation angle of the drive motor 30 is a rotation angle accumulated from the start of rotation of the drive motor 30.

In step 112, the control device 32 determines whether the rotation angle of the drive motor 30 has reached the predetermined value, but an applicable embodiment of the present disclosure is not limited thereto. For example, in step 112, the control device 32 may determine whether a current value or rotation speed of the drive motor 30 exceeds a threshold value. In this case, when the current value or rotation speed of the drive motor 30 exceeds the threshold value, the control device 32 is set to recognize that the tip 26A of the ramp 26 has touched the sidewalk 29 (see FIG. 3) or ground 27. The rotation speed of the drive motor 30 is a rotation speed thereof per unit time.

Then, in step 112, upon determining that the rotation angle of the drive motor 30 has reached the predetermined value, the control device 32 proceeds to step 114. In step 114, the control device 32 causes the driving of the drive motor 30 to be stopped, and proceeds to step 116. Next, in step 116, the extension of the ramp 26 within the ramp extension area 46 is completed, and the ramp 26 becomes usable.

Next, the control device 32 proceeds to step 118. In step 118, the control device 32 causes the door 20 to be opened. Accordingly, a user aboard the vehicle 12 can exit the vehicle 12 via the ramp 26, and a user outside the vehicle can board the vehicle 12 via the ramp 26.

As such, by using the ramp 26, as illustrated in FIG. 3, a user sitting in a wheelchair 56 or a user with a disability can easily board/exit the vehicle 12 because there is no step.

As described above, in the present embodiment, when it is confirmed that a user exists based on the images of the situation outside the vehicle which are captured using the camera 34 and the proximity sensor 36 detects the fact that the user is approaching based on, for example, the putting of the user's hand over the proximity sensor 36, the control device 32 causes the ramp 26 to be extended.

As such, a user sitting in a wheelchair can cause the ramp 26 to be extended by approaching, such as the putting of the user's hand, the proximity sensor 36 such that the user sitting in the wheelchair does not have to press the extension/storage button provided on the vehicle 12 to cause the ramp 26 to be extended. In other words, the user sitting in the wheelchair does not need a caregiver, and can cause the ramp 26 to be extended by himself/herself without the caregiver.

Further, in the present embodiment, since the control device 32 causes the ramp 26 to be automatically extended, it is possible to contribute to making the vehicle 12 automatically barrier-free. As such, it is possible for a user sitting in a wheelchair 56 or a user with a disability to smoothly board/exit the vehicle 12.

Moreover, in the present embodiment, since the ramp 26 is automatically extended, when a driver is aboard the vehicle 12, the driver does not have to manually install the ramp 26. Therefore, in the present embodiment, it is possible to reduce the time and labor required for installation of the ramp 26.

Therefore, in the present embodiment, it is not only possible to reduce burden of a caregiver but also possible to enable a user sitting in a wheelchair 56 or a user with a disability to board/exit the vehicle 12 without the caregiver. Consequently, the present embodiment can be applied to a vehicle that travels by autonomous driving without a driver.

On the other hand, in the present embodiment, in step 106, upon determining that the user is not putting his/her hand over the proximity sensor 36, the control device 32 proceeds to step 120. In step 120, the control device 32 determines whether the user is pointing his/her hand, such as stretching out his/her hand, at the proximity sensor 36.

In step 120, upon determining that the user is pointing his/her hand at the proximity sensor 36 based on the images of the situation outside the vehicle which are captured using the camera 34, the control device 32 proceeds to step 108.

In other words, in step 108, the control device 32 causes the drive motor 30 that causes the ramp 26 to move to be driven, and in step 110, the extension of the ramp 26 within the ramp extension area 46 is started.

In the present embodiment, even if the user sitting in the wheelchair is not approaching the proximity sensor 36, when it is confirmed, using the camera 34, that the user is pointing his/her hand, such as stretching out his/her hand, at the proximity sensor 36, the ramp 26 is extended. As such, in the present embodiment, the user sitting in the wheelchair can cause the ramp 26 to be extended even when not approaching the proximity sensor 36.

On the other hand, in step 120, upon determining that the user is not pointing his/her hand at the proximity sensor 36 based on the images of the situation outside the vehicle which are captured using the camera 34, the control device 32 proceeds to step 122.

In step 122, the control device 32 determines whether there has been an instruction on the extension of the ramp 26 from the mobile device 54. In step 122, upon determining that there has been an instruction on the extension of the ramp 26 from the mobile device 54, the control device 32 proceeds to step 108.

In step 108, as described above, the control device 32 causes the drive motor 30 that causes the ramp 26 to move to be driven, and in step 110, the extension of the ramp 26 within the ramp extension area 46 is started.

In the present embodiment, the mobile device 54 that transmits an extension instruction signal used for instructing the ramp 26 to be extended is provided. Upon receiving the extension instruction signal, the control device 32 causes the ramp 26 to be extended regardless of a detection result of the proximity sensor 36.

In other words, in the present embodiment, in a case where the mobile device 54 transmits the extension instruction signal, it is possible to, when the user's hands are full, such as holding an umbrella due to rain or the like, cause the ramp 26 to be extended even without making a gesture of the user, such as stretching out the user's hand toward the proximity sensor 36.

On the other hand, in step 122, upon determining that there has been no instruction on the extension of the ramp 26 from the mobile device 54, the control device 32 proceeds to step 118. In other words, in step 118, the control device 32 causes the door 20 to be opened.

In other words, in the present embodiment, in step 118, the control device 32 causes the door 20 to be opened after the extension of the ramp 26 is completed in step 116. In comparison, for example, when the ramp 26 is extended after the door 20 is opened, a case can be considered where a user may use the ramp 26 even when the extension of the ramp 26 has not been completed yet.

However, as described above, in the present embodiment, since the door 20 is opened after the extension of the ramp 26 is completed, such a problem does not occur. In other words, in the present embodiment, the safety of a user can be ensured.

In the present embodiment, although not shown, an extension/storage button is used for causing the ramp 26 to be extended or stored. As illustrated in FIG. 1, when the extension/storage button is pressed in the state where the ramp 26 is stored, a signal is transmitted to the control device 32 and the drive motor 30 is driven by the control device 32 such that the ramp 26 is extended. In other words, in the present embodiment, the operation of extending the ramp 26 can also be manually executed.

Storage of Ramp

Next, the time when the ramp 26 is stored will be described.

As illustrated in FIGS. 2 and 6, in step 200, using the vehicle weight detection device 38, the control device 32 determines whether the weight of the vehicle 12 has changed.

In other words, in step 200, when the vehicle weight has not changed, it is confirmed that no user has boarded/exited the vehicle 12. Therefore, in step 200, the control device 32 repeatedly executes this processing until the vehicle weight does not change.

In step 200, although the control device 32 determines whether the weight of the vehicle 12 has changed, an applicable embodiment of the present disclosure is not limited thereto as long as it can confirm boarding/exiting of a user.

Then, in step 200, upon determining that the vehicle weight has not changed, the control device 32 proceeds to step 202. In step 202, the control device 32 determines whether a predetermined time has elapsed.

In other words, in step 202, whether the predetermined time has elapsed since the vehicle weight did not change is checked. Therefore, in step 202, the control device 32 repeatedly executes this processing until the predetermined time elapses after the vehicle weight does not change.

Then, in step 202, upon determining that the predetermined time has elapsed since the vehicle weight did not change, the control device 32 proceeds to step 204. In step 204, the door 20 is closed.

Next, the control device 32 proceeds to step 206, in which it causes the drive motor 30 that causes the ramp 26 to move to be driven. Then, the control device 32 proceeds to step 208, in which the ramp 26 is stored in the storage unit 28. Next, the control device 32 proceeds to step 210. In step 210, the driving of the drive motor 30 is stopped.

Here, in the present embodiment, the control device 32 causes the ramp 26 to be stored after the door 20 is closed. In comparison, for example, when the door 20 is closed after the ramp 26 is stored in the storage unit 28, a case can be considered where the ramp 26 is stored in the state where the door 20 is open. In this case, since the door 20 is open, a user aboard the vehicle 12 may try to use the ramp 26 even when the ramp 26 is stored.

However, as described above, in the present embodiment, since the ramp 26 is stored after the door 20 is closed, such a problem does not occur. Therefore, in the present embodiment, the safety of a user can be ensured.

Moreover, in the present embodiment, as described above, the vehicle 12 is provided with the extension/storage button used for causing the ramp 26 to be extended and stored. As illustrated in FIG. 2, when the extension/storage button is pressed in the state where the ramp 26 is extended, a signal is transmitted to the control device 32 and the drive motor 30 is driven by the control device 32 such that the ramp 26 is stored. In other words, in the present embodiment, the operation of storing the ramp 26 can also be manually executed.

Although an example of the present disclosure has been described above, an applicable embodiment of the present disclosure is not limited thereto, and, in addition to that, it is needless to say that the present disclosure can be variously modified and implemented without departing from the scope thereof.

What is claimed is:

1. A ramp system for a vehicle, the ramp system comprising:
    a ramp extension and storage mechanism configured to extend and store a ramp from and into the vehicle, the ramp being configured to enable a user who boards and exits the vehicle to move;
    an image capturing device configured to capture an image of a situation outside the vehicle;
    a proximity sensor configured to detect a fact that a detection target is approaching; and
    a control device configured to, when the vehicle is stopped at a predetermined place, control the ramp extension and storage mechanism such that the ramp extension and storage mechanism extends the ramp in a case where it is confirmed, using the image capturing device, that the user exists outside the vehicle and the proximity sensor detects the fact that the detection target is approaching, wherein the control device is configured to open a door of the vehicle in response to a determination that the ramp extension is fully deployed.

2. The ramp system according to claim 1, wherein the control device is configured to, when it is confirmed, using the image capturing device, that the user is pointing the detection target at the proximity sensor, control the ramp extension and storage mechanism such that the ramp extension and storage mechanism extends the ramp.

3. The ramp system according to claim 1, further comprising a remote device configured to transmit an extension instruction signal used for instructing the ramp to be extended,
    wherein the control device is configured to, upon receiving the extension instruction signal from the remote device, control the ramp extension and storage mechanism such that the ramp extension and storage mechanism extends the ramp regardless of a detection result of the proximity sensor.

4. The ramp system according to claim 1, wherein the detection target is a part of a body of the user.

5. The ramp system according to claim 4, wherein the detection target is a hand of the user.

6. The ramp system according to claim 1, wherein the detection target is a belonging of the user.

7. The ramp system according to claim 1, wherein the proximity sensor is positioned to be blocked by a door of the vehicle when the door of the vehicle is in an open position.

8. The ramp system according to claim 1, wherein the control device is configured to close a door of the vehicle in response to a determination that a predetermined time has elapsed since the ramp extension was fully deployed and a weight of the vehicle has not changed.

9. The vehicle according to claim 1, wherein the predetermined place comprises a bus stop or a location designated by the user in advance.

10. A ramp system for a vehicle, the ramp system comprising:
    a ramp extension and storage mechanism configured to extend and store a ramp from and into the vehicle, the ramp being configured to enable a user who boards and exits the vehicle to move;
    an image capturing device configured to capture an image of a situation outside the vehicle;
    a proximity sensor configured to detect a fact that a detection target is approaching; and
    a control device configured to, when the vehicle is stopped at a predetermined place, control the ramp extension and storage mechanism such that the ramp extension and storage mechanism extends the ramp in a case where it is confirmed, using the image capturing device, that the user exists outside the vehicle and the proximity sensor detects the fact that the detection target is approaching, wherein the control device is configured to close a door of the vehicle in response to a determination that a weight of the vehicle has increased.

11. A vehicle comprising:
    a door; and
    a ramp system, wherein the ramp system comprises:
        a ramp extension and storage mechanism configured to extend and store a ramp from and into the vehicle, the ramp being configured to enable a user who boards and exits the vehicle to move;
        an image capturing device configured to capture an image of a situation outside the vehicle;
        a proximity sensor configured to detect a fact that a detection target is approaching; and
        a control device configured to, when the vehicle is stopped at a predetermined place, control the ramp extension and storage mechanism such that the ramp extension and storage mechanism extends the ramp in response to a determination that the user exists outside the vehicle and the proximity sensor detects the detection target is approaching the proximity sensor, wherein the control device is configured to open the door in response to a determination that the ramp extension is fully deployed.

12. The vehicle according to claim 11, wherein the control device is configured to control the ramp extension to extend the ramp in response to a determination that the user is pointing the detection target at the proximity sensor.

13. The vehicle according to claim 11, wherein the control device is configured to control the ramp extension to extend the ramp in response to receiving an extension instruction signal from a remote device.

14. The vehicle according to claim 11, wherein the detection target comprises at least one of a part of a body of the user or a belonging of the user.

15. The vehicle according to claim 11, wherein the vehicle is an autonomously driving vehicle.

16. The vehicle according to claim 11, wherein the proximity sensor comprises a single proximity sensor.

17. The vehicle according to claim 11, wherein the proximity sensor is positioned to be blocked by the door when the door is in an open position.

18. The vehicle according to claim 11, wherein the control device is configured to close the door in response to a determination that a predetermined time has elapsed since the ramp extension was fully deployed and a weight of the vehicle has not changed.

* * * * *